(12) United States Patent
Chen et al.

(10) Patent No.: US 7,440,940 B2
(45) Date of Patent: Oct. 21, 2008

(54) WEB SERVICE AGENT

(75) Inventors: Ye Chen, Sunnyvale, CA (US); Hartmut K. Vogler, Foster City, CA (US); Christian Drumm, Ulmet (DE); Kaj Van De Loo, San Francisco, CA (US); Claudius Link, Edingen (DE)

(73) Assignee: SAP AG, Walldorf (DE)

( * ) Notice: Subject to any disclaimer, the term of this patent is extended or adjusted under 35 U.S.C. 154(b) by 443 days.

(21) Appl. No.: 10/308,874

(22) Filed: Dec. 2, 2002

(65) Prior Publication Data

US 2004/0107196 A1 Jun. 3, 2004

(51) Int. Cl.
G06F 7/00 (2006.01)
G06F 17/30 (2006.01)
G06F 15/00 (2006.01)
G06E 1/00 (2006.01)
G06E 3/00 (2006.01)
G06G 7/00 (2006.01)
G06N 1/00 (2006.01)
G06F 15/16 (2006.01)

(52) U.S. Cl. .................. 707/4; 707/3; 707/10; 706/10; 709/203

(58) Field of Classification Search .............. 707/4, 707/10, 3; 709/227, 226, 203; 706/10
See application file for complete search history.

(56) References Cited

U.S. PATENT DOCUMENTS 5,781,703 A * 7/1998 Desai et al. ................... 706/50
6,205,482 B1 * 3/2001 Navarre et al. .............. 709/227
6,446,076 B1 * 9/2002 Burkey et al. ............... 707/102
6,574,628 B1 * 6/2003 Kahn et al. .................... 707/10
6,963,914 B1 * 11/2005 Breitbart et al. ............. 709/226
7,085,243 B2 * 8/2006 Decker et al. ............... 370/261
2003/0126136 A1 * 7/2003 Omoigui ...................... 707/10
2004/0030746 A1 * 2/2004 Kavacheri et al. ........... 709/203

OTHER PUBLICATIONS

Maximilien et al, 'Reputation and Endorsement for Web Services', Dec. 2001, ACM, vol. 3 Issue 1, pp. 24-31.*
Zhang et al, 'A SOAP-oriented component-based framework supporting device-independent multimedia web services', Dec. 11-13, 2002, IEEE, Proceedings on the Fourth International Symposium on Multimedia Software Engineering 2002, pp. 40-47.*

(Continued)

*Primary Examiner*—Wilson Lee
*Assistant Examiner*—Cheryl M Shechtman
(74) *Attorney, Agent, or Firm*—Blakely, Sokoloff, Taylor & Zafman, LLP

(57) ABSTRACT

Methods and apparatus, including computer program products, implementing and using techniques for providing a web service agent application. The web service agent application has a communication module and a processing module. The communication module receives requests from one or more web service applications or one or more adaptive agent applications; and transmits responses to one or more web service applications or one or more adaptive agent applications. The processing module receives a request for information from the communication module; identifies a resource that can fulfill the request for information; obtains a response to the request from the identified resource; and delivers the response to the request to the communication module.

26 Claims, 4 Drawing Sheets

OTHER PUBLICATIONS

Dale et al., "Advanced Web Services," available at http://nar.fujitsulabs.com/publications, Sep. 2, 2002, 9 pages.

Foundation for Intelligent Physical Agents (FIPA), "FIPA Agent Management Specification," available at http://www.fipa.org, Nov. 1, 2002, 32 pages.

Foundation for Intelligent Physical Agents (FIPA), "FIPA Agent Management Specificaiton," available at http://www.fipa.org, Oct. 3, 2001, 30 pages.

* cited by examiner

WEB SERVICE AGENT

BACKGROUND

The present invention relates to data processing by digital computer, and more particularly to information exchange over a communications network.

Web services (sometimes also referred to as application services) are services that are typically made available over an internet from a business's web server for web users or other web-connected computer software applications. Providers of web services are generally known as application service providers. Web services range from comprehensive services, such as storage management and customer relationship management, to much more limited services, such as the furnishing of stock quotes and the checking of bids for an auction item.

Web services can be accessed through a peer-to-peer arrangements or through central servers. Some web services can communicate with other services. This exchange of procedures and data is generally enabled by a class of software applications known as middleware. At present, the number of web services is steadily increasing, as services previously possible only with the standardized service Electronic Data Interchange (EDI) now are transformed into web services. Besides the standardization and wide availability to users and businesses of the Internet itself, web services are also increasingly enabled by the use of the Extensible Markup Language (XML) as a means of standardizing data formats and exchanging data. XML is the foundation for the Web Services Description Language (WSDL).

Web service providers and consumers of web services are typically businesses, making web service transactions predominantly business-to-business (B-to-B) transactions. An enterprise can both be a provider of one or more web services and also be a consumer of other web services. For example, a wholesale distributor of spices could assume a consumer role when the distributor uses a web service to check on the availability of vanilla beans, whereas the same distributor can assume a provider role when supplying prospective customers with different vendors' prices for vanilla beans.

An important challenge when designing and implementing software applications for businesses that use web services is the implementation of functionality for identifying a resource (such as a web service) that best matches a given software application's needs at a certain point in time. Large volumes of data are made available by web services on the Internet. However, if business software applications are to access and make efficient use of these services, there are several issues that need to be considered: such as, how to identify web services; how to find the best match for a specific request; how to get access to the services that best match a specific request; and, how to cooperate better with other software applications and services.

SUMMARY

In general, in one aspect, this invention provides methods and apparatus, including computer program products, implementing and using techniques for providing a web service agent application. The web service agent application has a communication module and a processing module. The communication module receives requests from one or more web service applications or one or more adaptive agent applications; and transmits responses to one or more web service applications or one or more adaptive agent applications. The processing module receives a request for information from the communication module; identifies a resource that can fulfill the request for information; obtains a response to the request from the identified resource; and delivers the response to the request to the communication module.

Advantageous implementations can include one or more of the following features. At least one of the one or more web service applications and the one or more adaptive agent applications can be internal to a local area network. At least one of the one or more web service applications and the one or more adaptive agent applications can be external to a local area network. At least one of the one or more web service applications and the one or more adaptive agent applications can be internal to a local area network and at least one of the one or more web service applications and the one or more adaptive agent applications can be external to the local area network. The communication module can automatically interpret a semantic of a web service application and publish a service offered by the web service application in a directory that is accessible to one or more web service agent applications. The communication module can automatically interpret the semantic by translating terms in a request for a web service application into terms used by the web service application to describe its services. The communication module can automatically interpret the semantic by interpreting a meaning of terms used by the web service application to describe its services.

The processing module can make only selected information available in response to the request for information. The selected information can be made available based on a predefined information policy for a web service application or an adaptive agent application requesting information. The processing module can negotiate a set of terms for a fulfillment of the request for information between the requesting application and a resource, based on a predefined negotiation protocol. The set of terms for the fulfillment can include a monetary compensation to be paid by a host of the requesting application to the host of the resource. The processing module can evaluate a performance of one or more web service applications; identify one or more web service applications that can provide the requested information; and select one of the web service applications based on the evaluation. The processing module can save information regarding a performance of one or more web service applications; and use the saved information to select a web service application.

In general, in one aspect, this invention provides a system including: one or more web service applications; one or more computer software applications that reside on one or more local area networks; and one or more web service agents. The web service agents can receive a request from a web service application or from a computer software application that resides on a local area network; locate a web service application or a computer software application external to the local area network that can respond the request; and negotiate a set of terms for the response between the requesting application and the located web service application or computer software application.

The invention can be implemented to realize one or more of the following advantages. Information exchange between adaptive agents and web services can be facilitated. Agents can gather information from whatever sources contain the desired information, and negotiate a price for the information, which allows information exchange outside traditional communication channels. Information can flow from an adaptive agent community to a web service, or from a web service to an adaptive agent community. A web service agent can act as a guard to prevent a web service from obtaining confidential information or company information from an adaptive agent, by just exposing selected information. Information obtained by a web service agent from one or more web services can provide an adaptive agent community with information that is necessary for operating a supply chain network, such as traffic information, weather information, and information regarding the reputation of potential clients or partners. The information obtained by the web service agent from one or more adaptive agent communities can provide a web service with information that companies can use in making supply chain decisions, such as information regarding manufacturers in a particular field. In summary, by introducing web service agents the following can be achieved: high performance and less missed rate of search, good scalability, transparency to both agent community and web service, high-level cooperation (such as negotiation) between web services and agents, less human intervention, and flexibility (two way communication).

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Overview

Figure 1:
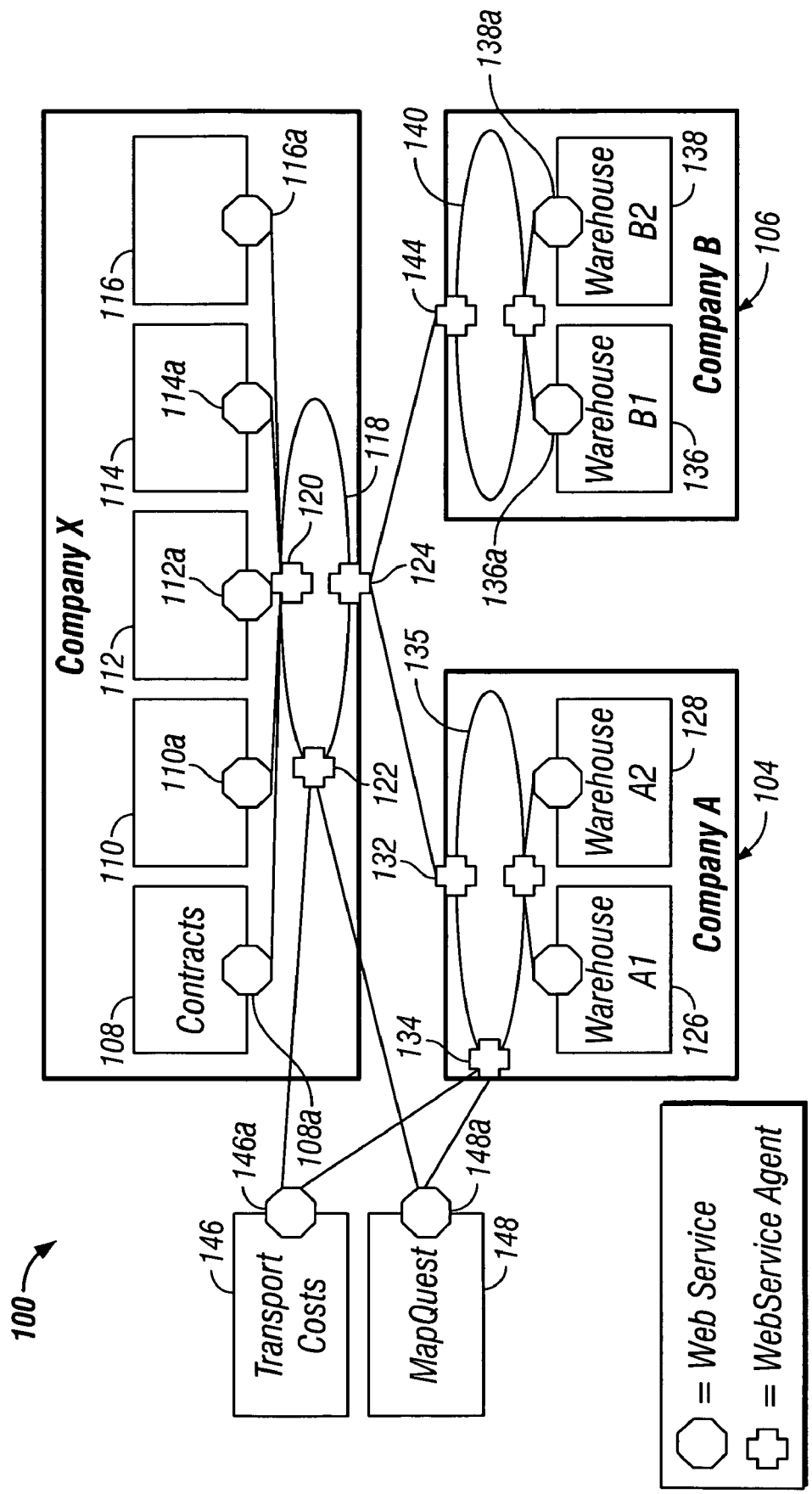
FIG. 1 is a schematic view of a system including web services and web service agents.

An adaptive agent is a simple software application for managing complex, real-time systems. The adaptive agent possesses some "intelligence" in the sense that the adaptive agent can be programmed to operate proactively to achieve goals that have been predefined by a user. The adaptive agent contains functionality for gathering information, reasoning to evaluate the gathered information, and acting independently without direction of a human user. Thus, the adaptive agent can watch systems, consider new information, monitor changes, learn from previous results, and trigger actions, which will bring the adaptive agent closer to achieving the predefined goals. Adaptive agents of this type can be deployed throughout an entire supply chain network (within and across companies), and thereby provide the means of communication to best use the network to achieve their goals. To some extent, adaptive agents make a supply chain network adaptive, so that the acting elements in the supply chain network can react automatically to changes that occur throughout the supply chain.

In order to perform the tasks needed to achieve their respective goals, the adaptive agents must collect enough information. The information can come from Enterprise Information Systems, such as APO (Advanced Planner and Optimizer) and R3—both manufactured by SAP AG in Walldorf, Germany; OLAP (OnLine Analytical Processing) systems, such as Business Warehouse—also manufactured by SAP; or from other devices, such as RFID (Radio Frequency ID) readers. Many of developing and developed web services can provide valuable data input from the Internet to adaptive agents within a supply chain network and assist the agents in achieving better results. An example of a typical business scenario in which web services and adaptive agents are useful comes from the transportation area. Here, an adaptive agent can be designed to determine a most cost-effective route for a driver who delivers products from a warehouse to a retail store. Web services can assist the adaptive agent by providing instant traffic and weather information. The adaptive agent might, in turn, communicate with an Inventory Early Warning Agent in the store that monitors information related to an inventory of the retail store, and thereby provide a more accurate prediction on future inventory change.

In order to help adaptive agents in the supply chain network to discover, identify and exchange information with the web service, a special type of adaptive agent, referred to as a web service agent can be used. The web service agent can work either as the single information distribution point for all adaptive agents running inside a particular framework, or serve on behalf of a single adaptive agent. Just like other adaptive agents, the web service agents can be distributed in various locations. The web service agent thus functions as a "middle man" for information requests between a web service and an adaptive agent community, or between two adaptive agent communities. The information requests can be made in either direction, that is, from a web service to an adaptive agent community, or from an adaptive agent community to a web service. The web service agent typically receives a request for information from an adaptive agent or an adaptive agent community. The information requested can be, for example, the regular supply of traffic information for a particular geographic area in which goods are shipped in a supply chain network. The web service agent searches for the proper web services for obtaining this type of information. Once the web service agent finds the information, the web service agent negotiates (if necessary) a price for obtaining the requested information. The web service agent then delivers the information to the requesting adaptive agent.

The communication can, of course, work in the opposite direction with a web service seeking to obtain information about a company's products, capacity, ability to respond quickly to orders for goods, and so on. In this case, the web service contacts the web service agent and the web service agent searches for the information, collects the information, and negotiates a price, if necessary, from an adaptive agent. The web service agent then delivers the information to the web service.

Last but not least, the web service agent can also function as a "security guard" to prevent a web service from obtaining proprietary or confidential company information from the adaptive agent.

Web Service Agent System Architecture

FIG. 1 shows an exemplary implementation of a system (100) including several web services and web service agents of the type that have been discussed above. In particular, the system (100) includes three companies, that is, company X (102), company A (104), and company B (106). Company X (102) has a set of services (108, 110, 112, 114 and 116) that are exposed as web services (108a, 110a, 112a, 114a and 116a) to a number of adaptive agents (118) in company X (102). Company X (102) also contains a set of web service agents (120, 122, and 124), which will be described in further detail below. One of the web service agents (120) communicates with the web services (108a, 110a, 112a, 114a and 116a) that are internal to company X (102), while the other web service agents (122 and 124) communicate with external resources.

Company A (104) has two warehouse services, Warehouse A1 (126) and Warehouse A2 (128) that are exposed as web services (126a and 128a, respectively) to a number of adaptive agents (130) in company A (104). Company A (104) also contains a set of web service agents (130, 132, and 134). One of the web service agents (130) communicates with the warehouse web services (128a and 130a) for company A (104), while another web service agent (132) communicates with a web service agent (124) in company X, and the last web service agent (134) communicates with external web services.

Company B (106) has two warehouse services, Warehouse B1 (136) and Warehouse B2 (138) that are exposed as web services (136a and 138a, respectively) to a number of adaptive agents (140) in company B (106). Company B (106) also contains a set of web service agents (142 and 144), which also will be described in further detail below. One of the web service agents (142) communicates with the warehouse web services (138a and 140a) for company B (106), while the other web service agent (144) communicates with a web service agent (124) in company X.

In addition to the three companies, the system (100) also includes two external services (146 and 148) that are exposed as web services (146a and 148a) and communicate with the web service agents (120) in company X (102) and the web service agents (134) in company A (104), respectively.

The web service agents (120-124, 130-134, and 140-144) can automatically interpret the semantics, for example, WSDL or XML of different web services (108a-116a, 126a-128a, 136a-138a, and 146a-148a). In order for the adaptive agents inside the multi-agent system (100) to identify the different information sources, the web service agents post the web services' capabilities into a web service directory (not shown) for the benefit of the adaptive agents in the system (100). There are two ways for web service agents to collect information from the different web services. A web service agent can expose itself to the rest of the system (100) as a web service that requests other information, and can upon receipt of this information provide its capacities directly. For example, the web service agent can register itself in a public service registry. This allows web services to directly initiate contacts with the web service agent. Alternatively, a web service agent can proactively search public registries. Whenever the web service agent finds a web service of interest, the web service agent brings the detailed contact information about the web service to the adaptive agents that the web service agent represents. The information collection, translation, and directory management processes are transparent to the adaptive agents. An adaptive agent contacts a web service through a web service agent in the same way that the adaptive agent exchanges information with other adaptive agents. The web service agent also updates the service description for a web service whenever the service description for the web service changes or when the web service agent is otherwise notified by the web services.

For an adaptive agent inside an agent community (118, 130 and 140), a web service agent is treated just like another adaptive agent and can be reached through a regular search of a directory of ACL (Agent Communication Language) messages. Through the communication, a web service agent can create a service description in WSDL for different agents and post the service description to a registration server (not shown). To balance the workload, multiple web service agents can be created individually, and each web service agent can be configured to serve as a shadow or slave agent to an adaptive agent inside the system (100).

A web service agent can respond to a request from a web service to match the web service with some requested adaptive agent. The match service can take place not only at content level but also at business level. Since the web service agent is an adaptive agent itself, the web service agent has an internal learning component to perform the matching. The web service agent internally keeps profiles of different adaptive agents (or for a master agent only), in which profiles the web service agent records the adaptive agents' recent requests and preferences. In addition, the web service agent can send a "Survey" message to the adaptive agents that the web service agent serves, in order to get feedback of the satisfaction level for the different web services. When a new request comes from an adaptive agent, the web service agent can select the best provider from a set of web services that provide the same or similar services.

Furthermore, a web service agent can deal with both object-centric messages (such as Remote Method Invocation, and Remote Function Call) and document-centric messages (BAPI, IDOC).

Finally, if a web service charges a cost for responding to a request, the web service agent can follow a pre-designed negotiation protocol to deal with the web service in question, for example, getting involved in the bidding process of an auction. All the negotiation processes are transparent to other adaptive agents.

Web Service Agent Elementary Operations

Figure 2:
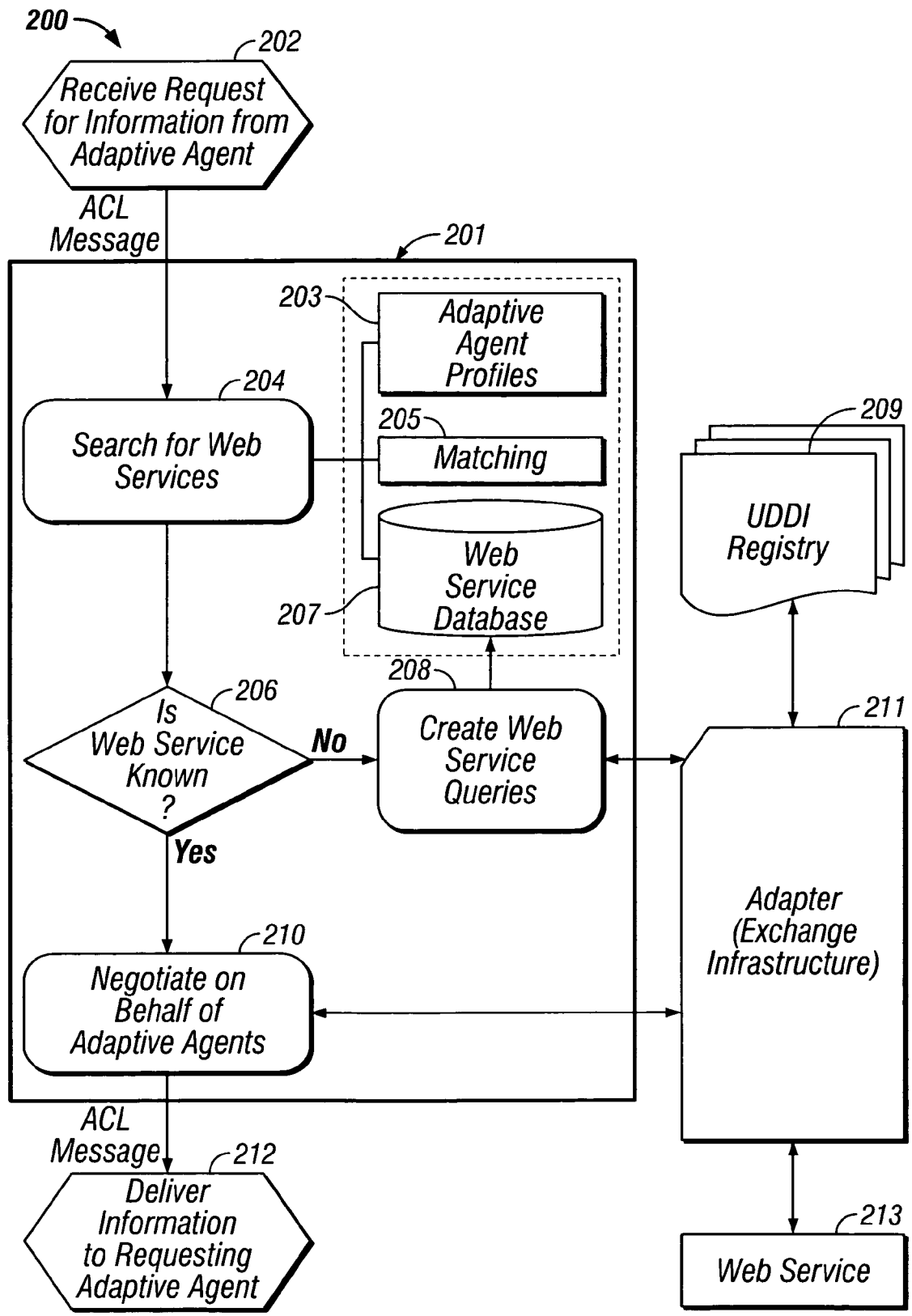
FIG. 2 is a schematic view of how a web service agent resolves a request from an adaptive agent.
Figure 3:
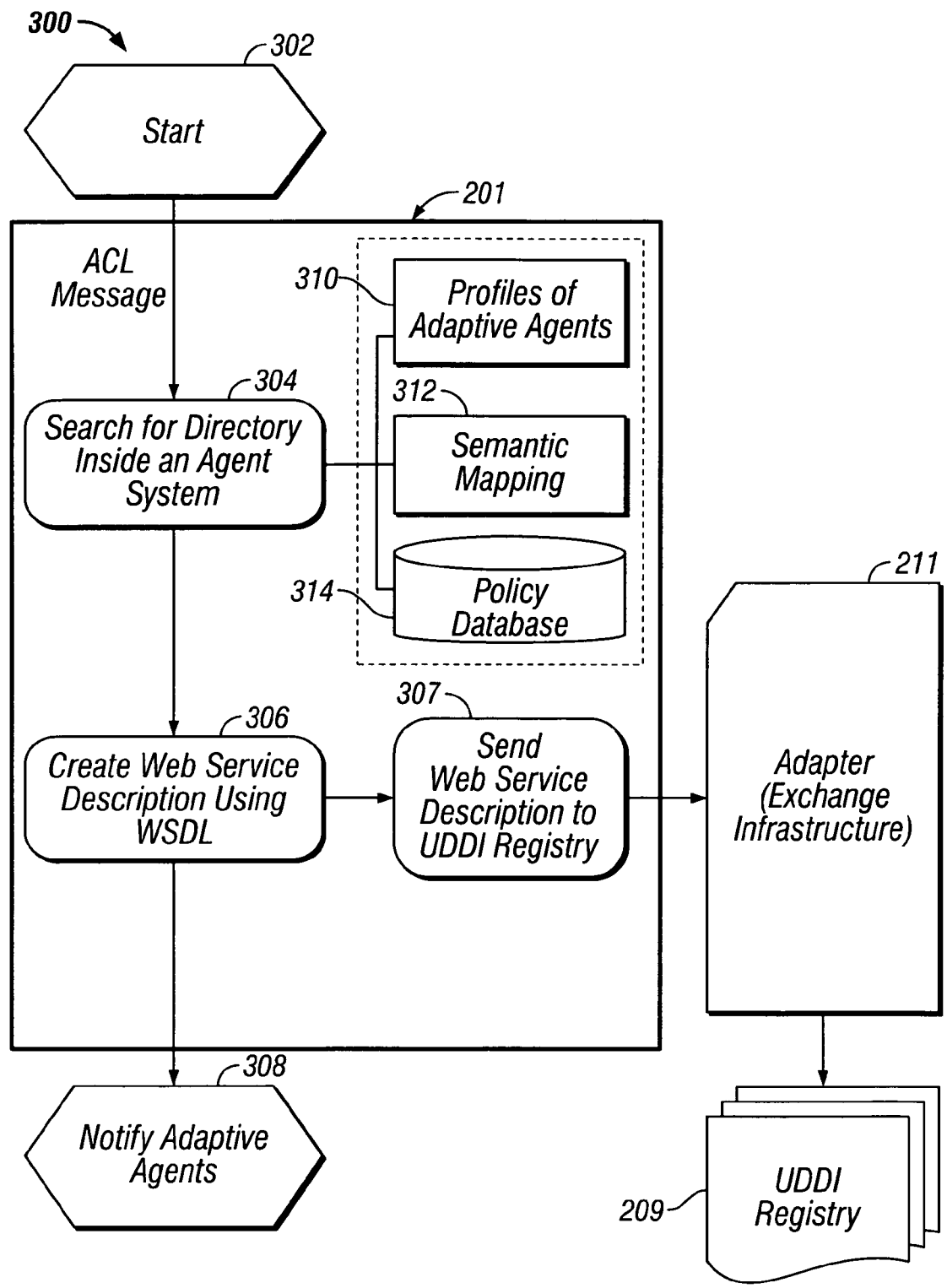
FIG. 3 is a schematic view of how a web service agent exposes adaptive agent functionality as a web service.
Figure 4:
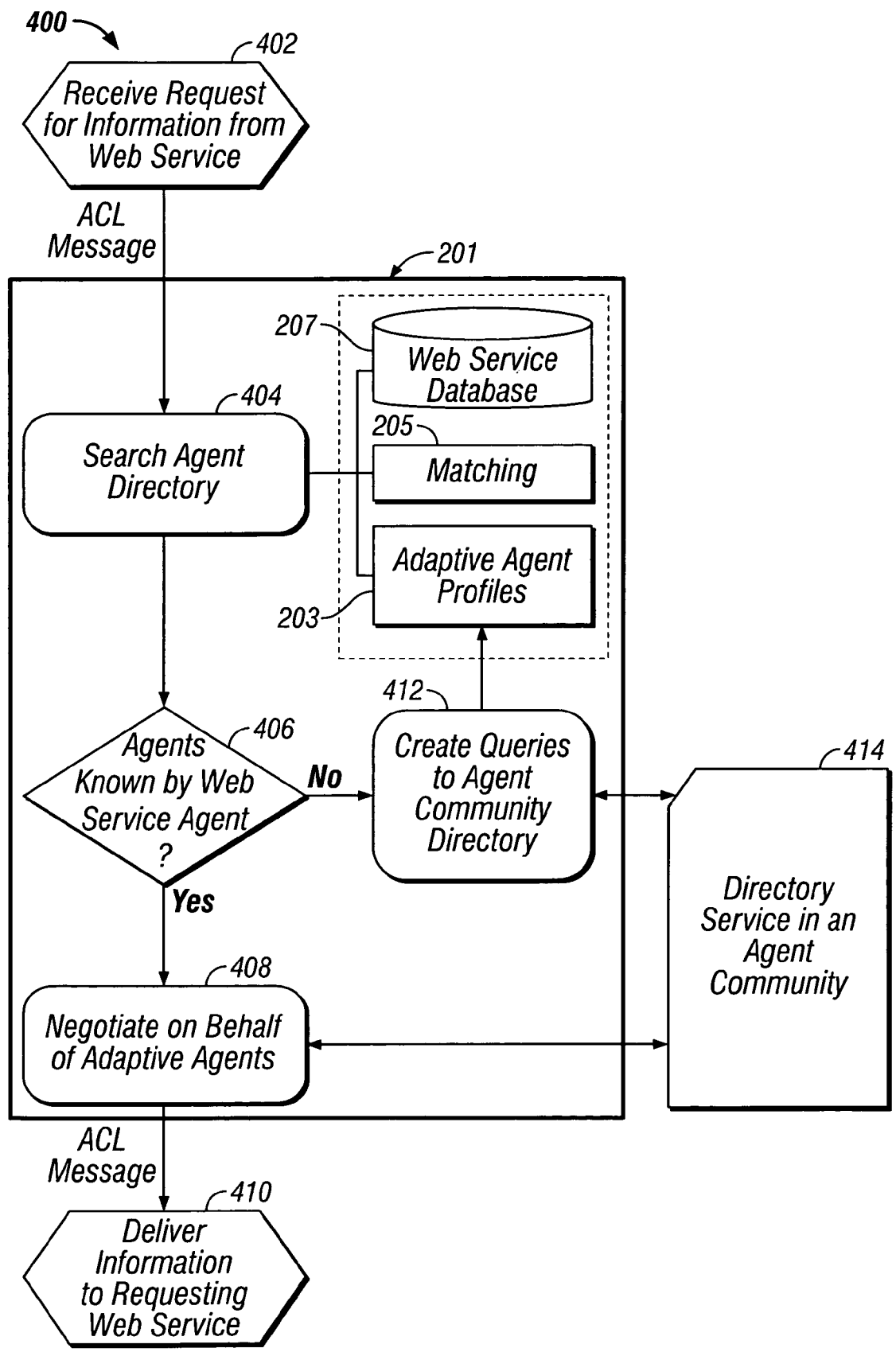
FIG. 4 is a schematic view of how a web service agent resolves a request from a web service.

Three different processes involving web service agents will now be described. These three processes form the basic operations of the web service agent and enable the higher-level functionality and interaction between adaptive agents, web services, and web service agents. The first process (200) of FIG. 2 shows how a web service agent resolves a request from an adaptive agent. The second process (300) of FIG. 3 shows how a web service agent exposes adaptive agent functionality as a web service. The third process (400) of FIG. 4 shows how a web service agent resolves a request from a web service.

As can be seen in FIG. 2, a process for resolving a request from an adaptive agent starts with receiving a request from the adaptive agent (step 202). In the implementation shown in FIG. 2, the request has the ACL format since this request is sent from one agent to another agent. It should be noted that all the elements of FIG. 2 that are enclosed by box 201 correspond to steps or features that take place within the web service agent.

After the web service agent has received the request, the web service agent searches for proper web services that can fulfill the received request (step 204). The web service agent has an internal web service database (207) that stores a set of profiles for web services that are offered by partners or other secure web service servers. The web service agent also has a collection of adaptive agent profiles (203) that can be stored, for example, in a database or as a plain file. When the web service agent searches for proper web services that can fulfill the received request, a matching (205) is performed with the database (207) and the agent profiles (203). The matching either returns a list of web services that satisfy the conditions specified by the agent queries or NULL, which indicates that no proper web services have been found.

The web service agent then determines whether there is an already known web service that can fulfill the request (step 206). If there is a known web service that can fulfill the request, the web service agent starts negotiations with this web service on behalf of the adaptive agent requesting the information (step 210). It should be noted that in some cases, negotiations may not be necessary, for example, if the information is offered at no cost. In one implementation, the negotiation with the web service (213) takes place through an adapter (211) that performs a translation between different types of data format, such as from a BOM (Bill Of Materials) used in a Company A to a BOM used in a Company B. If a company has its own XML standard, such as ebXML, and the web service uses a different standard, such as OASIS, the adapter (211) can perform a syntax mapping between these two types of format. The web service (213) typically communicates with the adapter using a SOAP protocol over HTTP, XML, or some other standardized communication format. The negotiations typically conform to a particular protocol set by the web service (213). The web service agent can use a range of negotiation techniques, depending on the way the web service agent is implemented. The negotiation techniques can be based on standard mathematical models, such as game theory models, distributed constraints satisfaction models, or simple priority models. In one implementation, the default model is the simple priority model. Finally, when the negotiations have been finished, the web service agent retrieves and delivers the desired information to the requesting adaptive agents (step 212), which ends the job of the web service agent.

If it is detected in step 206 that the web service agent is not aware of any known web service that can fulfill the request, the web service agent creates a set of web service queries (step 208). These requests are sent out, through the adapter (211) to the Internet, to look for information in UDDI registries (209), read advertisements that have been published by the web services using WSDL, and so on. The results of this external search are used to update the internal web service database (207), and typically continue until a good match has been found, or until the web service agent has determined that there is no good match. After a match has been found, the web service agent continues with negotiations on behalf of the adaptive agents, as was described above.

Another feature of the web service agent is to expose adaptive agent functionality as a web service. FIG. 3 shows schematically how the adaptive agent functionality can be exposed. Also here, the functionality of the web service agent is contained in the box 201. The exposure of functionality is typically done on a periodic basis (step 302), so that new web service agents added to the system of web service agents can be informed of the adaptive agent functionality, or changes therein. As can be seen in FIG. 3, the web service agent searches for a directory inside an agent community, to which directory the functionality of its adaptive agents can be posted (step 304). This search is typically performed using the profiles of adaptive agents (310), a semantic mapping (312) and a policy database (314) that are contained in the web service agent. The semantic mapping (312) refers to matches that follow a (business) implication and protocol. For example, in an agent's query the term "weather" can be used as a basic unit. However in the matching, the web service agent is capable of matching not only web services that provide information related to "weather," but also web services that provide information related to "temperature" or "humidity," which can be thought of as subsets to "weather." The policy database (314) is a rule-based system that stores rules and inferences that can be made from the rules.

A brief description of the web service API (Application Programming Interface) and the services provided is then created by the web service agent using WSDL (step 306), and the description is sent (step 307) to a UDDI registry (209) using an adapter (211). Finally the adaptive agents are notified that their functionality has been exposed (step 308), which completes this process.

As was discussed above, a web service agent can also receive requests made by a web service to one or more adaptive agents that are represented by the web service agent. FIG. 4 shows a process (400) for how a web service agent resolves a request from a web service. The process begins by the web service agent receiving a request from a web service (step 402). Again, it should be noted that all the elements of FIG. 4 that are enclosed by box 201 correspond to steps or features that take place within the web service agent.

After the web service agent has received the request, the web service agent searches for proper web services that can fulfill the received request (step 204). The web service agent uses its internal web service database (207), and its collection of profiles for adaptive agents (203). In the agent profile (203) the preference of the agent can be found, which makes it possible to filter out web services that the web service agent does not like to work with, even though the service offered by one or more of these web services might satisfy the query. When the web service agent searches for proper adaptive agents that can fulfill the received request, a matching (205) is performed with the database (207) and the profiles (203).

The web service agent then determines whether there is an already known adaptive agent that can fulfill the request (step 406). If there is a known adaptive agent or adaptive agent community that can fulfill the request, the web service agent starts negotiations, if necessary, with the web service requesting the information on behalf of this adaptive agent (step 408). When the negotiations have been finished, the web service agent delivers the desired information to the requesting web service (step 410), which ends the job of the web service agent.

If it is detected in step 406 that the web service agent is not aware of any known adaptive agents that can fulfill the request, the web service agent creates a set of queries to the directory (414) of agents (step 412). The results of these queries are used to update the internal profiles of the adaptive agents (203), and typically continue until a good match has been found, or until it has determined that there is no good match. After a match has been found, the web service agent continues with negotiations on behalf of the adaptive agents, as was described above.

The invention can be implemented in digital electronic circuitry, or in computer hardware, firmware, software, or in combinations of them. The invention can be implemented as a computer program product, that is, a computer program tangibly embodied in an information carrier, for example, in a machine-readable storage device or in a propagated signal, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. The web service agent can be used to perform integration among different agent communities across company borders and represent the integrated agent communities as a web service. Accordingly, other embodiments are within the scope of the following claims.

What is claimed is:

1. A web service agent application tangibly embodied in a machine readable storage medium, comprising:
 a communication module coupled with a plurality of applications including one or more adaptive agent applications and one or more web service applications, the communication module being operable to:
  receive a request for information from a requesting application, wherein the requesting application may be any one of the plurality of applications; and
  transmit a response to the requesting application; and
 a processing module operable to:
  receive a request for information from the communication module;
  compare one of the plurality of applications to attempt to match the request based on a preference profile and automatically search for an external application to service the request in response to a match not being made among one of the plurality of applications based on the preference profile;
  select an application to provide a resource that can fulfill the request;
  obtain a response to the request from the resource; and
  deliver the response to the request to the communication module.

2. The web service agent application of claim 1, wherein at least one of the plurality of applications is internal to a local area network.

3. The web service agent application of claim 1, wherein at least one of the plurality of applications is external to a local area network.

4. The web service agent application of claim 1, wherein at least one of the plurality of applications is internal to a local area network; and at least one of the plurality of applications is external to the local area network.

5. The web service agent application of claim 1, wherein the communication module is further operable to:
 automatically interpret a semantic of a web service application; and
 publish a service offered by the web service application in a directory that is accessible to one or more web service agent application.

6. The web service agent application of claim 5, wherein the communication module is operable to automatically interpret the semantic by translating terms in a request for web service into terms used by the web service application providing the requested web service to describe its services.

7. The web service agent application of claim 5, wherein the communication module is operable to automatically interpret the semantic of the web service application by interpreting a meaning of terms used by the web service application to describe its services.

8. The web service agent application of claim 1, wherein the processing module is further operable to:
 make only selected information available in response to the request for information.

9. The web service agent application of claim 8, wherein the selected information is made available based on a predefined information policy for a web service application or an adaptive agent application requesting information.

10. The web service agent application of claim 8, wherein the processing module further is operable to:
 negotiate a set of terms for a fulfillment of the request for information between the requesting application and a resource, based on a predefined negotiation protocol.

11. The web service agent application of claim 10, wherein the set of terms for the fulfillment include a monetary compensation to be paid by a host of the requesting application to a host of the resource.

12. The web service agent application of claim 1, wherein the processing module further is operable to:
 evaluate a performance of the one or more web service applications; and
 select the responding application based on the evaluation.

13. The web service agent application of claim 1, wherein the processing module further is operable to:
 save information regarding a performance of the web service application; and
 use the saved in formation to select a responding application.

14. A system, comprising:
one or more servers located in one or more local area networks comprising one or more web service applications;
one or more adaptive agent applications that reside on the one or more servers located in the one or more local area networks; and
one or more web service agents that reside on the one or more servers located in the one or more local area networks, the one or more web service agents coupled with a plurality of applications including the one or more adaptive agent applications and the one or more web service applications, the one or more web service agents being operable to:
receive a request from a requesting application, wherein the requesting application may be any one of the plurality of applications that resides on the one or more local area networks;
compare one of the plurality of applications to attempt to determine a match for the request with one of the plurality of applications based on a preference profile and automatically search to determine the match based on an external application to service the request in response to the match not being determined among one of the plurality of applications based on the preference profile;
select an application based on the match to provide a resource that can fulfill the request, wherein the application resides externally to the one or more local area networks; and
negotiate a set of terms for a response between the requesting application and the application that was selected.

15. A computer-implemented method, comprising:
receiving a request for information from a requesting application, wherein the requesting application is either a web service application or an adaptive agent application;
identifying a resource that can fulfill the request by attempting to match the request with one of a plurality of resources based on a preference profile and automatically searching for an external resource to service the request in response to a match not being made based on the preference profile;
obtaining a response to the request from an identified resource; and
transmitting the response to the requesting application.

16. The method of claim 15, wherein receiving a request comprises:
receiving a request from the requesting application internal to the local area network.

17. The method of claim 15, wherein receiving a request from the requesting application external to a local area network.

18. The method of claim 15, further comprising:
automatically interpreting a semantic of the web service application; and
publishing a service offered by the web service application in a directory that is accessible to one or more web service agent applications.

19. The method of claim 18, wherein automatically interpreting comprises:
translating terms in a request for web service into terms used by the web service application providing the requested service to describe its services.

20. The method of claim 18, wherein automatically interpreting comprises:
interpreting a meaning of terms used by the web service application to describe its services.

21. The method of claim 15, further comprising:
making only selected information available in response to the request for information.

22. The method of claim 21, wherein making selected information available comprises:
making selected information available based on a predefined information policy for the requesting application.

23. The method of claim 22, further comprising:
negotiating a set of terms for a fulfillment of the request for information between the requesting application and the resource, based on a predefined negotiation protocol.

24. The method of claim 23, wherein negotiating comprises:
negotiating a monetary compensation to be paid by a host of the requesting application to a host of the resource.

25. The method of claim 15, further comprising:
evaluating a performance of one or more web service applications;
selecting a responding web service application based on the evaluation.

26. The method of claim 15, further comprising:
saving information regarding a performance of one or more web service applications; and
using the saved information to select a responding web service application.

* * * * *